US012796607B2

(12) United States Patent
Neitemeier et al.

(10) Patent No.: US 12,796,607 B2
(45) Date of Patent: Nov. 17, 2026

(54) IMAGE ANALYSIS METHOD AND SELF-PROPELLED HARVESTER

(71) Applicant: CLAAS Selbstfahrende Erntemaschinen GmbH, Harsewinkel (DE)

(72) Inventors: Dennis Neitemeier, Lippetal (DE); Sven Carsten Belau, Gütersloh (DE); Ingo Bönig, Gütersloh (DE); Markus Brune, Harsewinkel (DE); Marwin Klein Heimkamp, Bramsche (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 327 days.

(21) Appl. No.: 18/751,515

(22) Filed: Jun. 24, 2024

(65) Prior Publication Data

US 2024/0423127 A1 Dec. 26, 2024

(30) Foreign Application Priority Data

Jun. 22, 2023 (DE) ......................... 102023116410.4

(51) Int. Cl.
*A01D 41/127* (2006.01)
*A01D 41/14* (2006.01)

(52) U.S. Cl.
CPC ....... *A01D 41/1277* (2013.01); *A01D 41/141* (2013.01)

(58) Field of Classification Search
None
See application file for complete search history.

(56) References Cited

U.S. PATENT DOCUMENTS 4,975,863 A 12/1990 Sistler et al.
6,449,932 B1 9/2002 Cooper et al.
(Continued)

FOREIGN PATENT DOCUMENTS

CN 108230307 A 6/2018
CN 112001283 A 11/2020
(Continued)

OTHER PUBLICATIONS

Mertens, David R. "Particle size, fragmentation index, and effective fiber: Tools for evaluating the physical attributes of corn silages." Proc. Four-State Dairy Nutr. & Mgmt. Conf. MWPS-4SD18. Dubuque, IA. 2005.
(Continued)

*Primary Examiner* — Dov Popovici
(74) *Attorney, Agent, or Firm* — Lempia Summerfield Katz LLC

(57) ABSTRACT

An image analysis method for the computer-implemented determination of the degree of grain cracking of grains. A flow of harvested material is processed by working units of a forage harvester, with the flow including whole grains and crushed grains as grain components, and non-grain components. Images of the flow of harvested material are recorded via a camera system and transmitted to an image analysis apparatus for evaluation. At least one working unit is controlled depending on the degree of grain cracking. To determine the degree of grain cracking, image pixels in the images are classified into grain components and non-grain components, with a classification of whole grains and crushed grains performed within the image pixels of an image classified as grain components using a segmentation model, and a loss function, used by the segmentation model, being weighted with an adjustable weighting factor.

18 Claims, 10 Drawing Sheets

(56) References Cited

U.S. PATENT DOCUMENTS

| | | | |
|---|---|---|---|
| 6,751,576 | B2 | 6/2004 | Hall et al. |
| 9,596,734 | B2 | 3/2017 | Delnoij et al. |
| 2005/0235623 | A1 | 10/2005 | Hettiger et al. |
| 2012/0004813 | A1 | 1/2012 | Baumgarten |
| 2012/0004815 | A1 | 1/2012 | Behnke |
| 2015/0046043 | A1 | 2/2015 | Bollin et al. |
| 2016/0000008 | A1 | 1/2016 | Schøler |
| 2016/0029561 | A1* | 2/2016 | Fischer .................. B02C 11/00 460/25 |
| 2016/0078611 | A1 | 3/2016 | Butts et al. |
| 2016/0081271 | A1 | 3/2016 | Mott et al. |
| 2016/0189007 | A1 | 6/2016 | Wellington et al. |
| 2017/0115211 | A1 | 4/2017 | Morimoto |
| 2017/0169314 | A1 | 6/2017 | Dijkman et al. |
| 2017/0235471 | A1 | 8/2017 | Schøler et al. |
| 2018/0177125 | A1 | 6/2018 | Takahara et al. |
| 2019/0059222 | A1 | 2/2019 | Kelber |
| 2019/0261559 | A1 | 8/2019 | Heitmann et al. |
| 2020/0037111 | A1 | 1/2020 | Hadar |
| 2020/0084966 | A1 | 3/2020 | Corban et al. |
| 2020/0084967 | A1 | 3/2020 | Corban et al. |
| 2020/0128735 | A1 | 4/2020 | Bonefas et al. |
| 2020/0281119 | A1 | 9/2020 | Sander et al. |
| 2021/0129188 | A1 | 5/2021 | Borrowman |
| 2021/0192715 | A1 | 6/2021 | Leshem et al. |
| 2021/0243950 | A1 | 8/2021 | Blank |
| 2021/0264252 | A1 | 8/2021 | Davis |
| 2021/0400871 | A1 | 12/2021 | Fischer et al. |
| 2022/0022375 | A1 | 1/2022 | Murray |
| 2022/0061215 | A1 | 3/2022 | Heitmann |
| 2022/0061216 | A1* | 3/2022 | Heitmann ........... G06F 18/2148 |
| 2022/0067903 | A1 | 3/2022 | Talbot et al. |
| 2022/0071091 | A1 | 3/2022 | Heitmann et al. |
| 2022/0132736 | A1 | 5/2022 | Meyers et al. |
| 2022/0217905 | A1 | 7/2022 | Murray et al. |
| 2022/0225568 | A1 | 7/2022 | Töniges et al. |
| 2022/0279720 | A1 | 9/2022 | Rasmussen et al. |
| 2022/0284698 | A1 | 9/2022 | Rasmussen et al. |
| 2022/0400612 | A1 | 12/2022 | Belau |
| 2023/0196575 | A1 | 6/2023 | Schade et al. |
| 2023/0232740 | A1 | 7/2023 | Heitmann et al. |
| 2024/0284826 | A1 | 8/2024 | Meyers et al. |
| 2024/0349644 | A1 | 10/2024 | Steen et al. |
| 2024/0428389 | A1* | 12/2024 | Neitemeier ........ A01D 41/1277 |
| 2025/0212724 | A1 | 7/2025 | Best et al. |
| 2026/0013437 | A1 | 1/2026 | Vandike et al. |

FOREIGN PATENT DOCUMENTS

| | | | |
|---|---|---|---|
| CN | 112236233 | A | 1/2021 |
| CN | 110887707 | B | 3/2022 |
| DE | 102014011308 | A1 | 2/2016 |
| DE | 102020122208 | A1 | 3/2022 |
| DE | 102021116118 | A1 | 12/2022 |
| EP | 2098109 | A1 | 9/2009 |
| EP | 3299996 | A1 | 3/2018 |
| EP | 3959957 | A1 | 3/2022 |

OTHER PUBLICATIONS

International Search Report for International Application No. 24168672.4-1105 mailed on Aug. 22, 2024.

Rasmussen, Christoffer Bøgelund, and Thomas B. Moeslund. "Maize silage kernel fragment estimation using deep learning-based object recognition in non-separated kernel/stover rgb images." Sensors 19.16 (2019): 3506 (20 pages).

* cited by examiner

IMAGE ANALYSIS METHOD AND SELF-PROPELLED HARVESTER

CROSS REFERENCE TO RELATED APPLICATIONS

This application claims priority under 35 U.S.C. § 119 to German Patent Application No. DE 10 2023 116 410.4 filed Jun. 22, 2023, the entire disclosure of which is hereby incorporated by reference herein. The present application is related to U.S. application Ser. No. 18/751,494, incorporated by reference herein in its entirety.

TECHNICAL FIELD

The present application relates to an image analysis method and system and a self-propelled forage harvester.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

US Patent Application Publication No. 2016/0029561 A1, incorporated by reference herein in its entirety, a method for the computer-implemented determination of the degree of grain cracking within a flow of harvested material processed by working units of a forage harvester, which may comprise whole grains and crushed grains as grain components, and non-grain components, wherein images of the flow of harvested material are cyclically recorded using a camera system and transmitted to an image analysis apparatus for evaluation. Using the method, images of grain-like particles may be identified in the images and then sorted into two size fractions. By determining the thickness of the two size fractions, the degree of grain cracking may be determined. Further, at least one working unit may be automatically controlled depending on the determined degree of grain cracking.

US Patent Application Publication No. 2022/0061215 A1, incorporated by reference herein in its entirety, discloses an image recognition algorithm that is based on machine learning. The forage harvester described in US Patent Application Publication No. 2022/0061215 A1 has a camera system for recording image data of crop material contained in the flow of harvested material, which may be analyzed using an image recognition algorithm in order to determine non-grain components from the geometric properties according to a predetermined calculation rule in order to determine the structural proportion of the non-grain components in the flow of harvested material.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
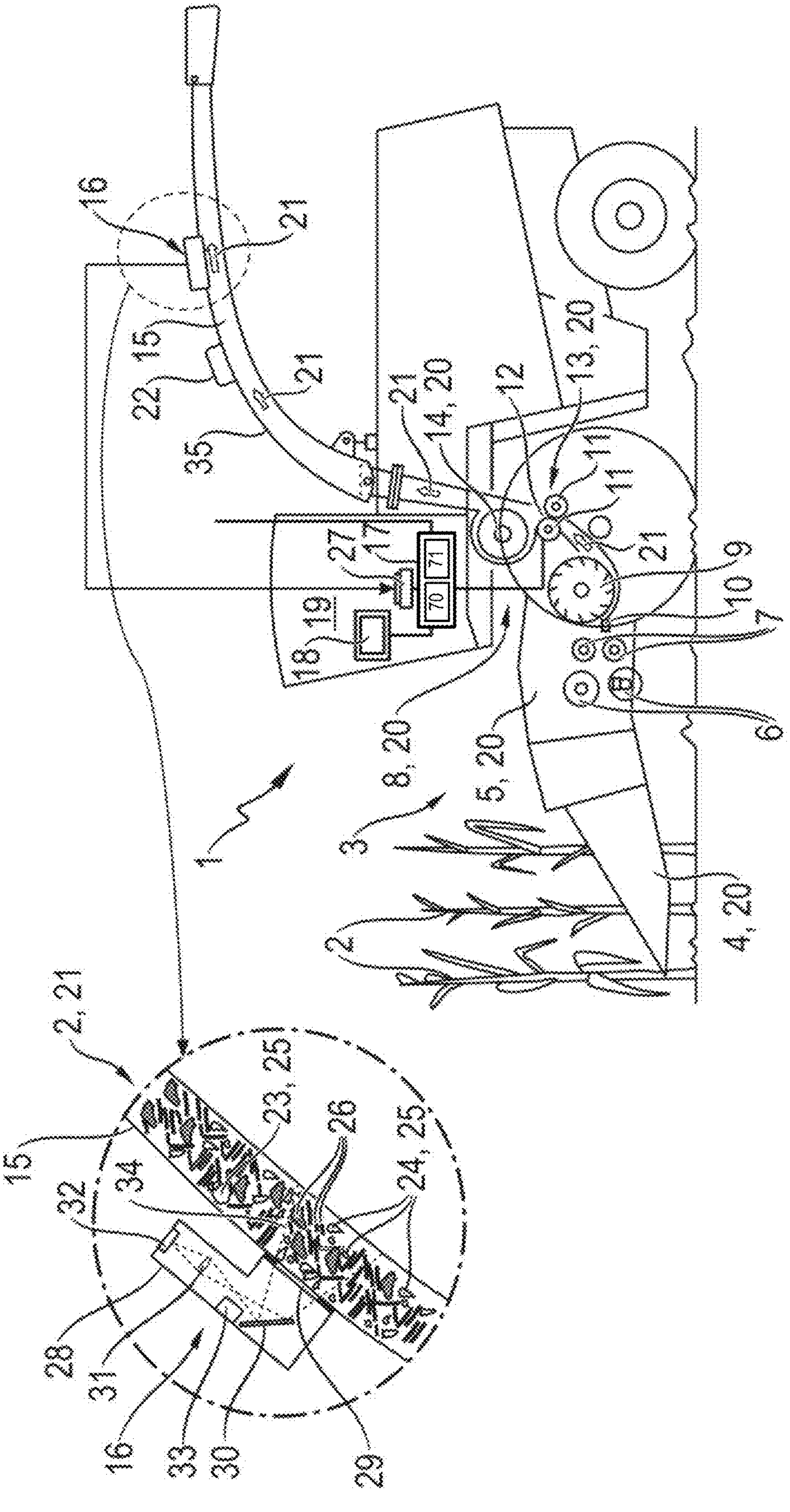
FIG. 1 illustrates a schematic of a forage harvester.

As discussed in the background, the degree of grain cracking may be determined. Given this, in one or some embodiments, an image analysis method and system are disclosed that improves the prediction of the determination of whole grains and crushed grains in the flow of harvested material for the computer-implemented determination of the degree of grain cracking.

In one or some embodiments, an image analysis method is disclosed for a computer-implemented determination of the degree of grain cracking within a flow of harvested material processed by working units of a forage harvester, which may comprise whole grains and crushed grains as grain components, and non-grain components. One or more images of the flow of harvested material may be recorded, such as cyclically recorded, using a camera system and transmitted to an image analysis apparatus for evaluation. At least one working unit may be automatically controlled depending on the specific degree of grain cracking.

In one or some embodiments, the image analysis method comprises classifying image pixels contained in the images into grain components and non-grain components by the image analysis apparatus in order to determine the degree of grain cracking, with a classification of whole grains and crushed grains being performed within the image pixels of a recorded image classified as grain components using a segmentation model, and a loss function used by the segmentation model may be weighted with an adjustable weighting factor.

In one or some embodiments, the image analysis method may be based on the consideration that when generating training data that are obtained from image data by a manual annotation process, non-grain components, such as corn husk or corn stalk fragments or the like, may be identified and classified as grains as well as crushed grains, which may be referred to as a “false positive” (FP), and that grains and crushed grains may not be identified and classified as such, which may be referred to as “false negative” (FN). This led to the realization that the proportion of grains classified as false positive (FP) or crushed grains generally predominates, which, as a result, may reduce the accuracy of the determination of the degree of grain cracking.

This influence on the accuracy of the disclosed determination of the degree of grain cracking may be compensated for by the fact that a loss function used by the segmentation model may be weighted with an adjustable weighting factor. In one or some embodiments, the weighting factor may take into account the ratio of detection rate and/or detection accuracy.

For this purpose, the weighting factor may be set to a value greater than 0 and less than 1, such as to a value between 0.2 and 0.5. Setting the weighting factor within the aforementioned range may result in the sensitivity (e.g., the probability with which a positive object is correctly classified as positive) being weighted higher than the positive prediction value (e.g., the proportion of objects correctly classified as positive). With a weighting factor greater than 0 and less than 1, the sensitivity may be weighted more heavily so that any one, any combination, or all of the grain components, whole grains and crushed grains are predicted with a higher probability that they are actually grain components on which the determination of the degree of grain cracking is based. If there is a lesser probability, the particles may be more likely not to be predicted. On the other hand, a value for the weighting factor greater than 1 may lead to the increased probability that an object will be classified as positive, wherein these are "true positive" (TP) objects (e.g., grain components correctly classified as grains or crushed grains) and "false positive" (FP) objects (e.g., non-grain components are incorrectly classified as grains or crushed grains).

The weighting factor may be selected in one of several ways. For example, a weighting factor from a previously performed harvesting process on the field to be worked may be set as the initial weighting factor. This may mean that the weighting factor, already having been optimized in the past, may be used as the basis for the image analysis method. Alternatively, an initial weighting factor may be set within a predetermined value range, such as in a range between 0.2 and 0.5.

Furthermore, in one or some embodiments, the initially-set weighting factor may be iteratively adjusted. This may be done within the context of a new generation of the segmentation model. In particular, the regeneration of the segmentation model may be performed at a predetermined time, such as during the year or in the following year.

In particular, the images with a resolution within a range between 128×128 pixels to 1024×1024 pixels may be fed to the image analysis apparatus for evaluation as input data from the camera system. Images with a resolution within a range between 256×256 pixels to 512×512 pixels may be supplied as input data from the camera system since an image size in this range may have sufficient resolution so that even small grain components may be sufficiently recognizable in order to learn their features during training and be able to predict them with a higher degree of certainty during the subsequent image analysis. A higher resolution while recording the images contrastingly may not lead to a significant improvement in prediction accuracy. The increase in resolution, which may be associated with an increased amount of data, may lead to an increase in inference time, which may have an effect on the evaluation time.

In one or some embodiments, the weighting factor may be set depending on limit values for inference time and achievable coefficient of determination of the segmentation model, wherein the limit value for the inference time may be less than a predetermined time (e.g., 30 ms), and the limit value for the coefficient of determination is greater than a predetermined percentage (e.g., 70%).

In particular, the image analysis method may be performed by at least one neural network that uses a U-Net architecture as the segmentation model. The characteristic image features of the image may be extracted using the neural network in a common feature submodule. A feature submodule may also be referred to as an encoder and, specifically in this case, as a feature extractor. In one or some embodiments, the MobileNet may be used as the feature extractor. In particular, a U-Net architecture, whose input size and output size are each selected as 256×256 pixels, may be characterized by an inference time that is less than 30 ms, wherein the required coefficient of determination is greater than 70%. This may make it possible to perform the image analysis method on mobile hardware of a forage harvester, which may be characterized by less computing power than stationary hardware, such as that which may be present on a farmyard.

In one or some embodiments, the classification data determined using the segmentation model and the used training data of whole grains and crushed grains may be fed to the loss function, from which a loss value may be determined, which may be used in an optimization step to automatically adjust the weighting factor.

In one or some embodiments, to classify whole grains and crushed grains, a length determination of a long main axis and a short main axis of each classified grain component may be performed using a length-width comparison, and to calculate the degree of grain cracking, the quotient may be formed from the sum of the area of classified grain components which may fall below an adaptive limit value for the length of the short main axes, and the sum of the area of all classified grain components. The use of an adaptive limit value, such as a dynamic adaptive limit value, to determine the degree of grain cracking, taking into account harvested material properties, may take into account the external influences that affect the actual grain size during plant growth.

The adaptive limit value may be adapted automatically and/or manually for this purpose.

When automatically adjusting the limit value, it is contemplated that a stored or retrievable preset initial value of the limit value may be used at the start of the harvesting process, which may then be adapted as things progress (e.g., as the harvesting process progresses). For example, within the framework of the documentation for a field, historical data may be accessed which may contain information on previously cultivated harvested material and past harvesting processes.

In one or some embodiments, a manual adaptation of the limit value may be performed by selecting from a predefined or predefinable range of values for values of a minimum grain size and a maximum grain size and/or by entering at least one value of an average grain size that is valid for the harvesting process. The manual adaptation of the limit value may be supported by the image analysis method in such a way that if there is a significant deviation of the calculated mean value representing the mean grain size from the manually specified value, a notification of this may be generated for review by an operator (e.g., a notification output to a touchscreen on the forage harvester). In one or some embodiments, this notification may contain a suggestion for manual adjustment of the limit value, and may further include the ability of the operator to provide input (e.g., input via the touchscreen) in order to accept or reject the suggestion.

In particular, the adaptive limit value may be adapted cyclically, such as at intervals. Cyclical adaptation may refer to the repeated adaptation of the adaptive limit value within a definable period of time and/or depending on a definable harvested material throughput or a definable travel distance on a field during the harvesting process.

An average value representing the mean grain size for the visible area may be formed from the sum of the area of whole grains determined within the interval, from which the limit value to be adapted may be dynamically derived as a fractional value of the long main axis and/or the short main axis. For example, half of the short and/or long main axis may be used as the fractional value so that the grain may be considered to be quartered. Alternatively, other fractional values, such as thirds or fifths of the short and/or long main axis, are also contemplated. The adapted limit value updated in this way may be used as the basis for the image analysis method to determine the degree of grain cracking.

Furthermore, a self-propelled forage harvester is disclosed comprising an attachment as the working unit configured to pick up or collect harvested material, one or more working units configured to process a flow of harvested material produced from the picked up harvested material, a driver assistance system configured to automatically control the one or more working units, a camera system configured to record (such as cyclically record) images of the flow of harvested material and to transmit the one or more images to an image analysis apparatus, which may be configured to perform image analysis using the image analysis methodology disclosed herein, in order to determine a degree of grain cracking of grains in the flow of harvested material. The driver assistance system may be configured to automatically control the one or more working units, such as a working unit designed as a secondary crushing device, depending on the determined degree of grain cracking.

Reference may be made to all explanations of the image analysis method according to the invention. In particular, the image analysis apparatus may be designed with an algorithm for machine learning, which may be implemented as a neural network in the form of a U-Net architecture of a convolutional neural network or as a recurrent neural network.

In one or some embodiments, the forage harvester may have a camera system which may be configured to generate one or more images of the flow, in order for another device, such as the image analysis apparatus, to evaluate the flow of harvested material processed by the working units. In one or some embodiments, the camera system comprises an RGB camera, which may be configured to detect the flow of harvested material flowing through a discharge chute of the forage harvester (e.g., generate one or more images of the flow of harvested material) and may be arranged or positioned in a housing, such as arranged or positioned on the discharge chute. In one or some embodiments, a transparent viewing pane may be arranged or positioned in the discharge chute, past which the flow of harvested material to be detected flows, and at least one light source arranged or positioned opposite the viewing pane, the light beams of the at least one light source being directed onto the flow of harvested material, and at least one mirror, which may be configured to deflect light reflected by the flow of harvested material into a lens arranged or positioned in the RGB camera. The RGB camera may transmit recorded images of the flow of harvested material to the image analysis apparatus for evaluation.

In one or some embodiments, the RGB camera may record the images at a frame rate within a range of 20 frames/second to 40 frames/second, the exposure time being between 5 microseconds and 25 microseconds, and the lens of the RGB camera having a focal length of between 7 mm and 10 mm. Other values for the frame rate, exposure time, and focal length are contemplated.

In one or some embodiments, the RGB camera may record images of the flow of harvested material, such as at a frame rate within a range of 25 images/second to 35 images/second. In one or some embodiments, the exposure time may be between 9 microseconds and 21 microseconds.

In one or some embodiments, the design of the RGB camera of the camera system and/or the parameters of the RGB camera may be optimally adapted for the recording of images by the RGB camera to the conditions prevailing in the discharge chute, such as the flow speed of the flow of harvested material after exiting a secondary shredding device, which may be within a range of 15 m/s to 20 m/s. In this case, the images with the preferred resolution within a range between 256×256 pixels to 512×512 pixels may be fed by the camera system as input data to the image analysis apparatus, which may be designed with the machine learning algorithm as a neural network in the form of a U-Net architecture of a convolutional neural network or as a recurrent neural network.

With the design and suggested parameterization of the RGB camera, an image analysis method for the computer-implemented determination of the degree of grain cracking of grains within the flow of harvested material processed within the working units of the forage harvester may be performed using the image analysis apparatus of the camera system, which may enable the differentiation of grain components and non-grain components with sufficient accuracy for this and, based on this, the differentiation between whole grains and crushed grains by optical sifting. Sufficient accuracy of the differentiation of grain components and non-grain components and/or the differentiation between whole grains and crushed grains by the image analysis method may be based on a predetermined coefficient of determination.

Referring to the figures, FIG. 1 shows, schematically and by way of example, a forage harvester 1 according to one aspect of the invention while harvesting a crop of plants, in particular corn plants 2, on a field. Example forage harvesters are disclosed in US Patent Application No. 2023/0232740 A1 and US Patent Application No. 2022/0071091 A1, both of which are incorporated by reference herein. A pick-up device 3 of the forage harvester 1 comprises, in a manner known per se, an attachment 4 which may be exchanged to be adapted to the plant material to be harvested, and a pulling-in apparatus 5 with several pairs of rollers 6, 7 which may take the harvested material from the attachment 4 in order to feed it to a chopping device 8.

The chopping device 8 may comprise a rotationally driven cutterhead 9, a shear bar 10 over which the corn plants 2 are pushed by the adjacent pair of rollers 7 of the pulling-in apparatus 5 in order to be chopped by the interaction of the shear bar 10 with the cutterhead 9. Downstream from the chopping device 8 may be a secondary crushing device 13, which may also be referred to as a corn cracker, with a pair of conditioning or cracker rollers 11, which may delimit a gap 12 of adjustable width, hereinafter also referred to as the cracker gap, and rotate at different speeds in order to crush corn kernels contained in the material stream passing through the gap 12. A secondary accelerator 14 may give the shredded harvested material, in this case the corn plants 2, conditioned in the secondary crushing device 13, the necessary speed to pass through a discharge chute 15 and be transferred to an accompanying vehicle (not shown). The discharge chute 15 may have an essentially rectangular cross-section along its lengthwise extension. The discharge chute 15 may have a continuous closed upper side 35 and a partially open underside. Side walls may be arranged or positioned orthogonally to the upper side 35 of the discharge chute 15, which may laterally delimit and guide a flow of harvested material 21 (illustrated by arrows) conveyed through the discharge chute 15.

At least one camera system 16 may be arranged or positioned on the discharge chute 15 in order to generate images 44 of the flow of harvested material 21 conveyed through the discharge chute 15. Furthermore, an NIR sensor 22 may be arranged or positioned on the discharge chute 15. The NIR sensor 22 may be used to determine harvested material properties. The NIR sensor 22 may be positioned here, such as upstream from the camera system 16 on the upper side of the discharge chute 15.

The attachment 4, the pulling-in apparatus 5, the chopping device 8, the secondary crushing device 13 and the secondary accelerator 14 (or post accelerator) and their particular components may comprise working units 20 of the forage harvester 1, which may serve to harvest the corn plants 2 of a crop and/or to process the corn plants 2 of the crop within the context of the harvesting process.

Within the flow of harvested material 21 processed by the working units 20 of the forage harvester 1 are whole grains 23 and crushed grains 24 as grain components 25, and non-grain components 26, such as stalks, leaves and the like.

In one or some embodiments, the camera system 16 has an RGB camera 32 for recording image data of the crop material contained in the flow of harvested material 21. The RGB camera 32 may record spatially-resolved image data. In one or some embodiments, the term "spatially resolved" may mean that it is possible to distinguish details of the harvested material in the image data. The RGB camera 32 therefore may have at least enough pixels to enable the disclosed image analysis, which is explained further below. In a measurement routine, the camera system 16 may capture image data of the harvested material in the flow of harvested material 21 using the RGB camera 32, in this case the chopped corn plants 2. This measuring routine may correspondingly be performed while the forage harvest 1 is operating.

The images generated by the camera system 16 may be transmitted to an image analysis apparatus 27 and analyzed thereby. In this regard, the camera system 16 may wired and/or wirelessly transmit the images to image analysis apparatus 27.

In one or some embodiments, the image analysis apparatus 27 is connected to (such as in wireless and/or wired communication with) a driver assistance system 17 or may be designed as a component of the driver assistance system 17. The driver assistance system 17 may be connected to an input/output unit 18 (e.g., a touchscreen) in a driver's cab 19 of the forage harvester 1 in order to output evaluation results thereto. In either instance, the image analysis apparatus 27 may transmit information (such as the length of a long main axis 46 and a short main axis 47 of each classified grain component for the driver assistance system 17 to determine the degree of grain cracking or the degree of grain cracking (if the image analysis apparatus 27 itself determines the degree of grain cracking). This transmission of information may be from one separate apparatus to another, in the instance where the image analysis apparatus 27 is separate from the driver assistance system 17, or may be within different components, in the instance where the image analysis apparatus 27 is a component of the driver assistance system 17. In one or some embodiments, the driver assistance system 17 may automatically control any one, any combination, or all of: at least one actuator for adjusting the gap width of the cracker gap 12; the differential rotational speed; or the rotational speed levels of the rollers 11 of the secondary crushing device 13.

The driver assistance system 17 may include at least one processor 70 and at least one memory 71. In one or some embodiments, the processor 70 may comprise a microprocessor, controller, PLA, or the like. Similarly, the memory 71 may comprise any type of storage device (e.g., any type of memory). Though the processor 70 and the memory 71 are depicted as separate elements, they may be part of a single machine, which includes a microprocessor (or other type of controller) and a memory. Alternatively, the processor 70 may rely on the memory 71 for all of its memory needs. The memory 71 may comprise a tangible computer-readable medium that include software that, when executed by the at least one processor 70 of the driver assistance system 17 is configured to perform any one, any combination, or all of the functionality described herein regarding any computing device.

The processor 70 and the memory 71 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

As discussed above, the image analysis apparatus 27 may be connected to a driver assistance system 17 or may be designed as a component of the driver assistance system 17. When connected to the driver assistance system, the image analysis apparatus 27 may itself have at least one processor and at least one memory configured to perform the operations ascribed to the image analysis apparatus 27 discussed herein. When designed as a component of the driver assistance system 17, the image analysis apparatus 27 may use the processor 70 and the memory 71 of the driver assistance system 17. In either instance, the image analysis apparatus 27 may access at least one memory in order to: access image(s) acquired by the RGB camera 32; and perform its image analysis by accessing one or more methodologies (such as semantic image segmentation, object recognition or instance segmentation as part of at least one neural network). After which, the image analysis apparatus 27 may transmit information (either the degree of grain cracking itself or information in order to determine the degree of grain cracking) to the driver assistance system 17 for the driver assistance system 17 to perform the automatic control based on the degree of grain cracking.

The rollers 11 of the secondary crushing device 13 each may rotate during operation at a speed settable as a parameter, wherein the gap 12 may remain between the rollers with a gap width settable as a parameter (which may be automatically changed via automatic control by the driver assistance system 17). Furthermore, the rollers 11 may have a rotational speed difference that may be set as a parameter, by which the rotational speeds of the rollers 11 differ (which may be automatically changed via automatic control by the driver assistance system 17). The driver assistance system 17 may automatically control at least one of the parameters depending on a degree of grain cracking $CSPS_{opt}$ to be determined (e.g., the driver assistance system 17 may automatically select the value(s) for the respective parameters based on the degree of grain cracking $CSPS_{opt}$).

In one or some embodiments, the background to the control of the secondary crushing device 13 depending on the degree of grain cracking is that it may be particularly important when the harvested material is used as feed for animals and/or when used in biogas plants for the grain components 25 of the harvested material to be cracked (e.g., comminuted). It may be important to crack the grain components 25 so that the starch contained therein becomes accessible and is not protected by the husk of the grain component 25. The cracking of grain components 25 may be accomplished on the one hand by chopping up the harvested material and on the other hand substantially by the secondary crushing device 13. The secondary crushing device 13 may be set so that one, some, or all of the grain components 25 are sufficiently chopped, which may be accompanied by increased consumption of energy or fuel. Accordingly, in one or some embodiments, to achieve a maximum commutation and accordingly a high processing quality of the grain components 25, the gap width may be automatically adjusted to a minimum. In one or some embodiments, this unnecessarily high consumed energy therefore cannot be converted into an increase in the driving speed so that a system-related, correspondingly reduced output per area results.

The disclosed method for computer-implemented determination of the degree of grain cracking $CSPS_{opt}$ of the grains 23 is explained below. For this purpose, images 48 of the flow of harvested material 21, which may be taken cyclically by the camera system 16 (which may comprise an optical recording apparatus), may be transmitted to the image analysis apparatus 27 for evaluation using an image analysis method.

In one or some embodiments, the schematically portrayed camera system 16 may also have an optical system in addition to the RGB camera 32. The optics may comprise any one, any combination, or all of a mirror 30, a lens 31 arranged or positioned on the RGB camera 32 and at least one light source 33. The RGB camera 32 may have a field of view 34 in which it may detect light reflected from the flow of harvested material 21. The RGB camera 32 and the lens system may be arranged or positioned in a housing 28 of the camera system 16, which may be attached to the top of the discharge chute 15. A translucent viewing pane 29 may be arranged or positioned on the side of the housing 28 facing the discharge chute 15. The viewing pane 29 may comprise (or consists) of sapphire glass. The viewing pane 29 may be designed round or polygonal.

The housing 28 of the camera system 16, arranged or positioned on the upper side of the discharge chute 15, may be arranged or positioned in the second half of the discharge chute 15 in relation to its longitudinal extension. The housing 28 may be detachably attached to the upper side 35 of the discharge chute 15 using two mounting devices 36.

Figure 2:
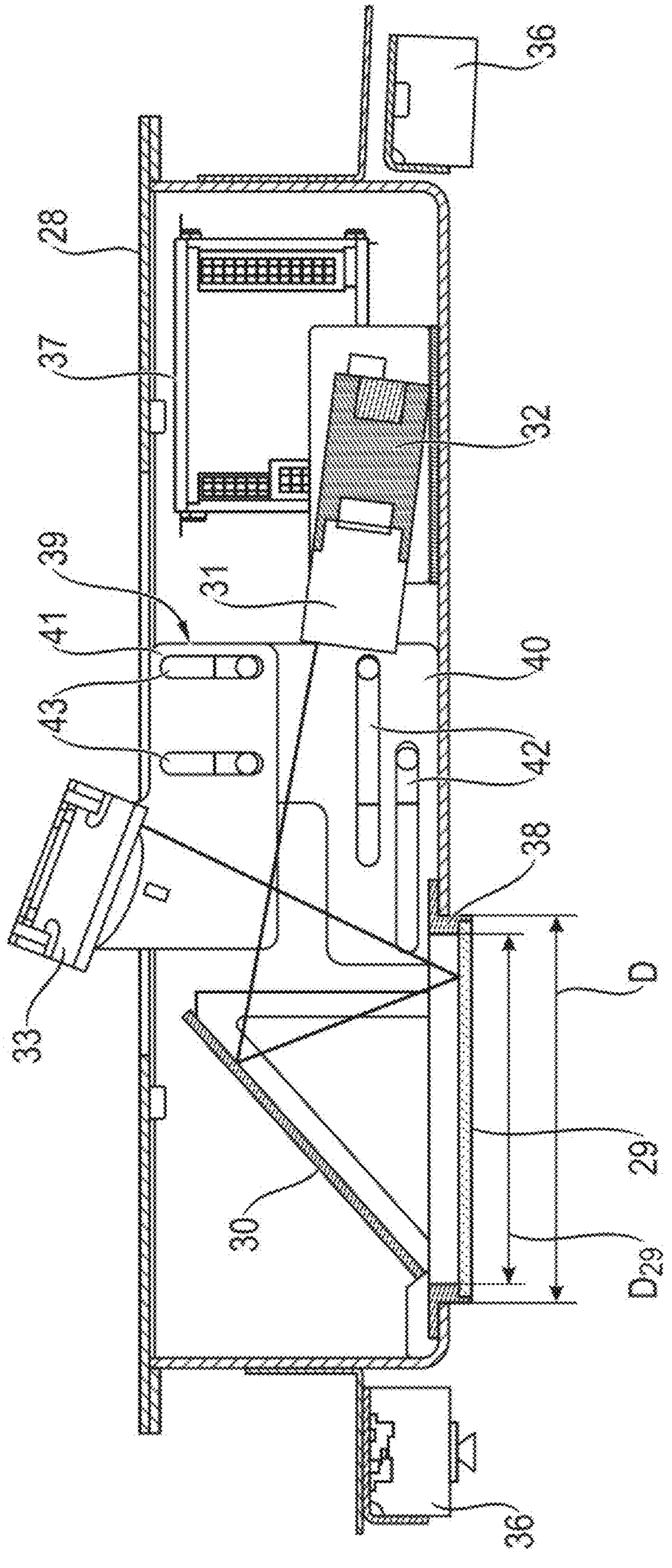
FIG. 2 illustrates a schematic and example simplified representation of a camera system.

FIG. 2 illustrates a schematic and example simplified representation of the camera system 16. An opening may be provided in the upper side 35 of the discharge chute 15, into which the viewing pane 29 is recessed tightly flush with the surface of the upper side 35 of the discharge chute 15 facing the flow of harvested material 21. In one or some embodiments, the viewing pane 29 and the opening are designed substantially circular. Alternatively, the viewing pane 29 and the opening may be designed polygonal. The viewing pane 29 may be glued into a substantially annular holder 38. The holder 38 may be fixed in the housing 28. The holder 38 may be detachably attached to the housing 28.

In one or some embodiments, the viewing pane 29 may have a visible diameter $D_{29}$ that may be detected by the lens 31 and may be greater than 7 cm and less than 13 cm. In one or some embodiments, the viewing pane 29 may have a detectable visible diameter $D_{29}$ which may be greater than or equal to 9 cm and less than or equal to 12 cm. D denotes an overall diameter of the viewing pane 29, which may be designed round in the illustrated embodiment and contains an edge area between 2 mm and 4 mm, which may serve to rest on the holder 38.

In the case of a polygonal design of the viewing pane 29, an at least quadrangular design, the visible diameter $D_{29}$ that may be detected through the lens 31 is taken into account by the respective edge length.

With the arrangement of the viewing pane 29 glued into the holder 38, the necessary edge support surface may be taken into account in the visible diameter $D_{29}$ of the viewing pane 29 detectable through the lens 31, which may be effective when picking up the flow of harvested material. The visible diameter $D_{29}$ of the viewing pane 29, that may be detected through the lens 31, may limit the field of view 34.

In one or some embodiments, the thickness of the viewing pane 29 may be within a range between 2 mm and 4 mm. The thickness of the viewing pane 29 may essentially depend on the overall diameter D or the edge lengths when there is a polygonal design of the viewing pane 29.

In one or some embodiments, the RGB camera 32 may take pictures of the flow of harvested material 21 at a frame rate within a range of 20 frame/second to 40 frame/second. In one or some embodiments, the frame rate is within a range of 25 frames/second to 35 frames/second. The exposure time may be between 5 microseconds and 25 microseconds. In one or some embodiments, the exposure time is within a range between 9 microseconds and 20 microseconds. The lens 31 of the RGB camera 32 may have a focal length of between 7 mm and 10 mm. Furthermore, the lens 31 may have an image angle within a range from 32° to 37°. In one or some embodiments, the lens 31 may have an image angle within a range from 340 to 35°.

The at least one mirror 30 in the housing 28 may result in an object width within a range of 175 mm to 195 mm. In particular, the dimensions of the mirror 30 may be selected such that the image angle of the lens 31 is taken into account, and the entire viewing window of the viewing pane 29, which corresponds to the translucent diameter $D_{29}$, may be visualized. The object width within a range from 175 mm to 195 mm may be realized using at least one mirror 30 so that exceeding the maximum permissible height due to the height of the housing on the discharge chute 15 in road traffic is avoided. By using the focal length of between 7 mm and 10 mm with an object width within a range of 175 mm to 195 mm, undesirable artifacts such as image curvature, which are to be expected with shorter focal lengths and at the same time lower object widths, may be avoided. In one or some embodiments, the object width may lie within a range of 180 mm to 190 mm.

The camera system may have a control unit 37 for controlling the at least one light source 33. The control unit 37 for controlling the at least one light source 33 may be arranged or positioned in the housing 28. In one or some embodiments, at least one matrix LED spotlight is used as the light source 33.

The position of the at least one light source 33 in the housing 28 may be adjustable in the vertical direction and/or in the horizontal direction relative to the viewing pane 29 and the mirror 30. For this purpose, the light source 33 may be arranged or positioned in the housing 28 using a holding device 39, which may have components that may move relative to the housing 28. This may enable calibration and/or fine adjustment.

In the illustrated embodiment, the holding device 39 comprises substantially L-shaped holding elements 40, 41 as relatively movable components, which may be arranged or positioned in pairs. In each case, one pair of the substantially L-shaped holding elements 40, 41 may be arranged or positioned on one side of the light source 33. The holding elements 40, extending sectionally in the longitudinal direction of the housing 28, may have horizontally running slots 42 arranged or positioned parallel to one another, within which the holding elements 40 may be displaced relative to the housing 28. The holding elements 41 may have vertically extending slots 43 arranged or positioned parallel to one another, within which the holding elements 41 may be displaced relative to the holding elements 40 or the housing 28.

The distance of the at least one light source 33 to the center of the viewing pane 29 may be between 120 mm and 130 mm. The at least one light source 33 may be arranged or positioned and inclined at an angle of between 31° and 34° to the surface of the viewing pane 29.

In addition, the RGB camera with the lens 31 arranged or positioned thereon may also be adjustable in a vertical direction and/or in a horizontal direction and/or its inclination.

Figure 3:
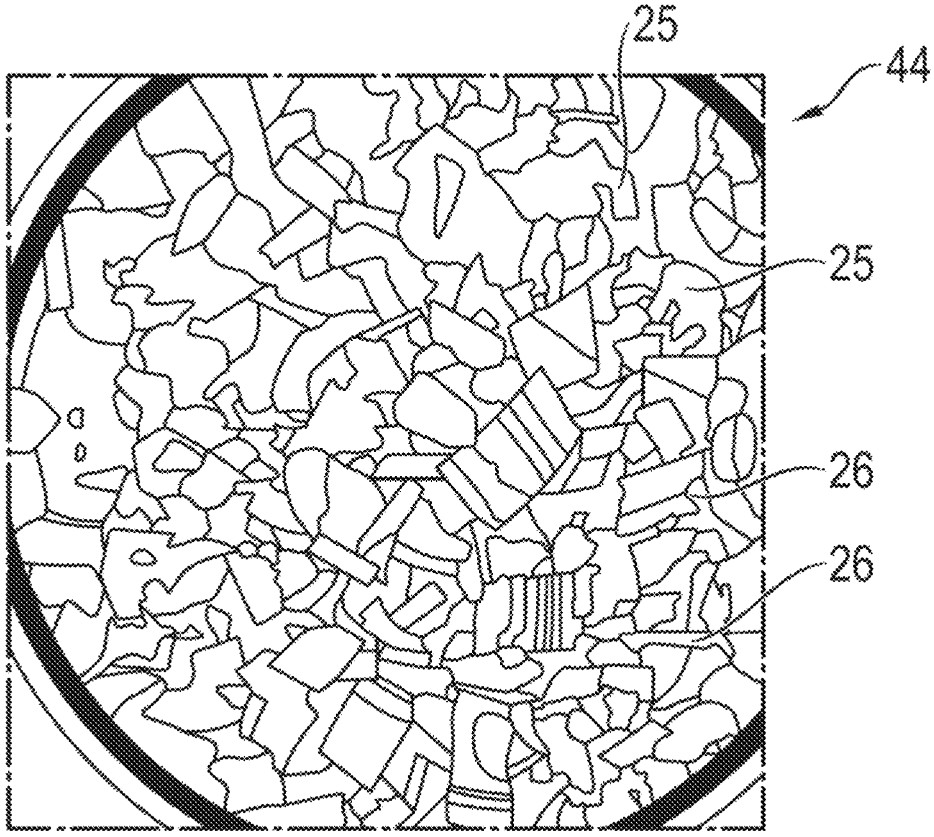
FIG. 3 illustrates a schematic and example image of chopped harvested material recorded by the camera system.

FIG. 3 illustrates a schematic and exemplary image 44 of chopped harvested material, in this case the corn plant 2, taken by the camera system 16. In the image 44 taken by the camera system 16, the grain components 25 and non-grain components 26 of the chopped corn plant 2 are visible. The recognition of grain components 25 and the differentiation of whole grains 23 from chopped grains 24 may only be possible to a very limited extent using such an image 44.

Figure 4:
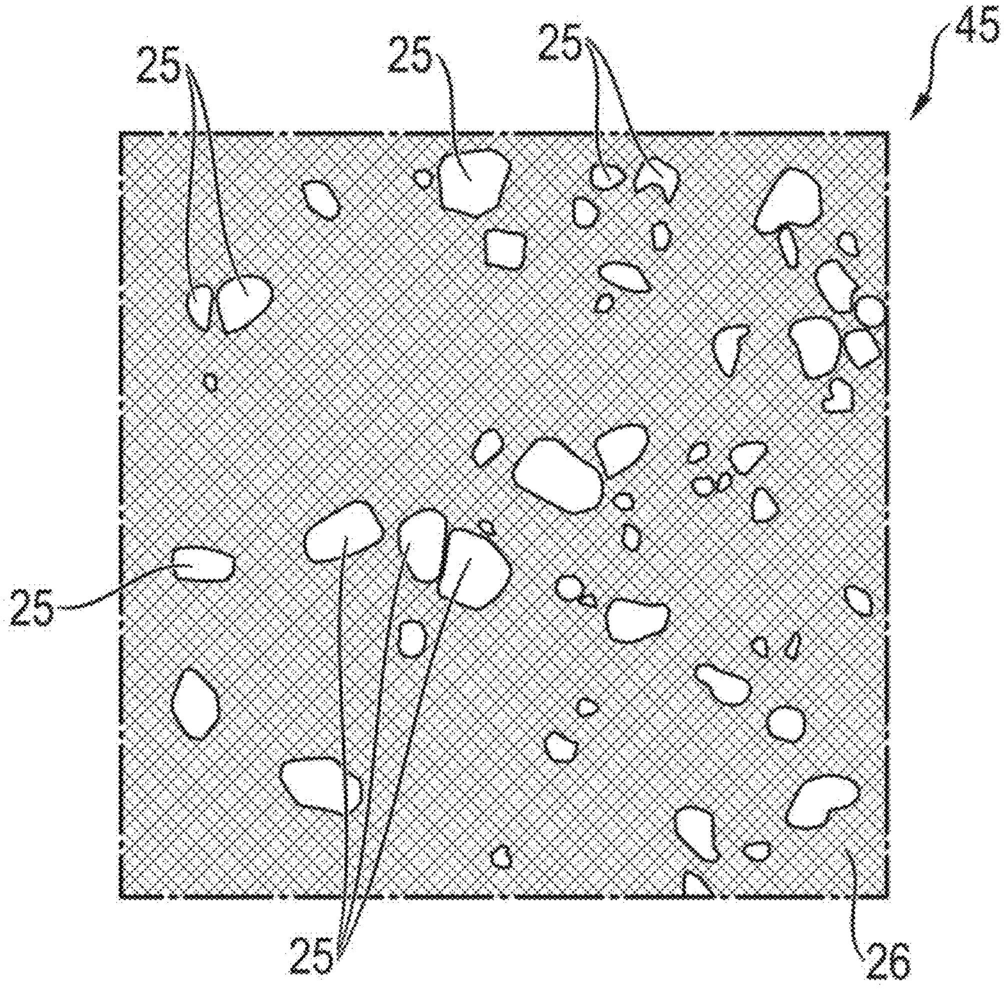
FIG. 4 illustrates a schematic and example binary image of the image analyzed by an image analysis method according to FIG. 3.

FIG. 4 illustrates a schematic and exemplary binary image 45 of the image 44 processed by an image analysis method according to FIG. 3. The binary image 45 generated by semantic segmentation may only show grain components 25, while all non-grain components 26 visible in the image 44 may not be shown. For this purpose, the detected grain components 25 may be displayed in white, for example, while the detected non-grain components 26 may be displayed uniformly (e.g., in black), so that the detected non-grain components 26 form a uniform background of the visualization in the binary image 45.

In a first stage of the image analysis method, pixels contained in the images 44 taken by the camera system 16 may be classified into grain components 25 and non-grain components 26. This may be performed in one of several ways, such as by semantic image segmentation. Other computer-implemented methods of computer-based vision that may be used for image analysis are, for example, object recognition or instance segmentation.

Figure 5:
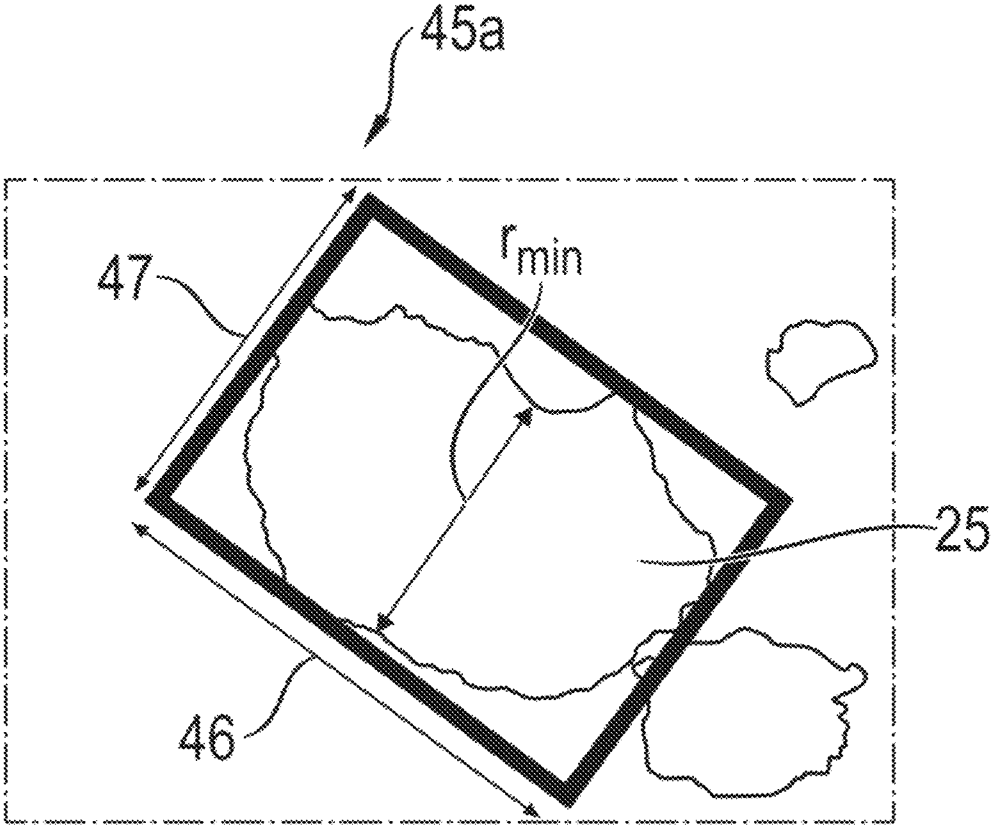
FIG. 5 illustrates a schematic and example enlarged section of the binary image according to FIG. 4.

In a second stage of the image analysis method, a length determination of a long main axis 46 and a short main axis 47 of one, some or each classified grain component 25 may be performed using a length-width comparison, as shown in FIG. 5 as an example.

FIG. 5 shows a schematic and exemplary enlarged section 45*a* of the binary image 45 according to FIG. 4. The largest value $r_{min}$ determined for the length of the short main axis 47 of each grain component 25 may be used as the basis for the subsequent image analysis method.

The first stage and the second stage of the image analysis method may be performed by at least one neural network. The at least one neural network may be a component of the image analysis apparatus 27 (e.g., stored in a memory of the image analysis apparatus 27). The at least one neural network may use a U-Net architecture, such as a segmentation model. The characteristic image features of the image may be extracted via the at least one neural network in a common feature submodule. A feature submodule may also be referred to as an encoder and, specifically as a feature extractor. The MobileNet may be used here as the feature extractor.

The determination of the long main axis 46 and the short main axis 47 of each classified grain component 25 for determining the area may be performed cyclically at time-spaced intervals.

Figure 6:
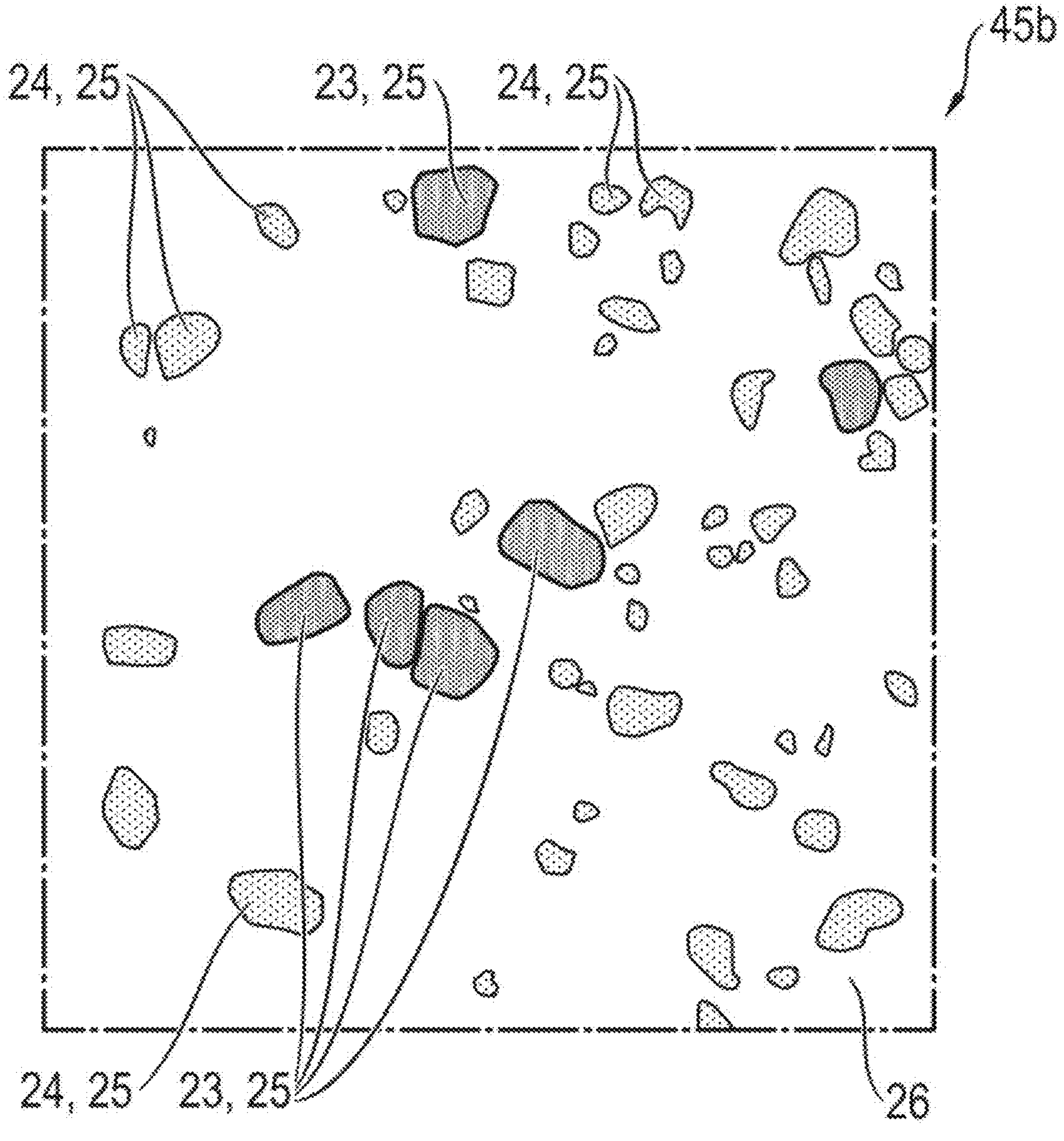
FIG. 6 illustrates a schematic and example evaluation of the binary image according to FIG. 5.

FIG. 6 illustrates a schematic and exemplary extended evaluation of the binary image 45 according to FIG. 4. A multi-class classification using semantic image segmentation may be used to generate an image 45*b* in which a distinction is made between the whole grains 23 as one class of multi-class classification and the crushed grains 24 as a further class of multi-class classification.

In one or some embodiments, the multi-class classification may be used to determine an average grain size. This is to be seen against the background that corn plants 2 from different regions and/or harvest years have different average grain sizes, which may influence the determination of the degree of grain cracking.

The image analysis method may begin with the recording of the image 44 by the camera system 16, which may be transmitted (wired and/or wirelessly) to the image analysis apparatus 27. Subsequently, the image 44 may be classified using semantic segmentation in order to generate the binary image 45. The grain components 25 and non-grain components 26 may be classified on the basis of the image pixels contained in the respective image 44. The binary image 45 generated in this way corresponding to the image 44 may only contain information about the grain components 25.

The length of the long main axis 46 and the short main axis 47 of each classified grain component 25 may then be determined using the length-width comparison. Using binarization, the visible surface of the respective grain component 25 may be determined from the grain components 25 determined in this way using just the number of pixels, and the length determination of the long main axis 46 and the short main axis 47 may also be performed. The calculation of the degree of grain cracking $CSPS_{opt}$ (which may be the basis of the image evaluation) may be generally performed according to the following equation [1].

$$CSPS_{opt} = \frac{\sum A_{KB}(r_{47} < r_{min})}{A_{KBG}} \qquad \text{Eq. [1]}$$

In this equation, $CSPS_{opt}$ denotes the degree of grain cracking determined by optical sieving, $r_{min}$ a limit value for the maximum length of the short main axis 47 of the detected grain components 25, $A_{KB}$ the visible area of grain components 25 whose length of the short main axis 47 is less than the limit value $r_{min}$, and $A_{KBG}$ the visible area of all detected grain components 25. The limit value $r_{min}$ corresponds to a sieve opening width of an optical sieve. If grain components 25 pass through this optical sieve opening width (e.g., if a maximum length $r_{47}$ of the short main axis 47 of a grain component 25 falls below the limit value $r_{min}$), the detected grain component 25 may correspond to a crushed grain 24. The limit value $r_{min}$ may correspond to the limit value of 4.75 mm on which laboratory tests according to the prior the art are based.

In order to be able to react to fluctuations in the actual grain size during the harvesting process to be performed, the calculation of the degree of grain cracking $CSPS_{opt}$ may be performed according to the following Equation [2].

$$CSPS_{opt} = \frac{\sum A_{KB}(r_{47} < r_{adapt})}{A_{KBG}} \quad \text{Eq. [2]}$$

Here, $r_{adapt}$ refers to an adaptive limit value for the maximum length $r_{47}$ of the short main axis 47 which, when exceeded, classifies the respective grain component 25 as a whole grain 23 and which, when undershot, classifies the respective grain component 25 as a crushed grain 24.

In one or some embodiments, the adaptive limit value $r_{adapt}$ may not be kept constant during the course of a harvesting process, but may be adjusted cyclically in order to be able to react to fluctuations in the actual grain size.

The use of the adapted limit value $r_{adapt}$ (such as dynamically adapted limit value $r_{adapt}$) to determine the adaptive degree of grain cracking $CSPS_{opt}$, taking into account changing crop properties, may take into account the external influences that affect the actual grain size during plant growth. This may mean that the degree of grain cracking $CSPS_{opt}$ may be dynamically adapted to the actual harvesting conditions, which may have an advantageous effect on the control of working units 20, such as the secondary crushing device 13, of the forage harvester 1.

In one or some embodiments, the adaptive limit value $r_{adapt}$ may be adapted cyclically at intervals. Cyclically adapting may comprise repeatedly adapting the limit value $r_{adapt}$ within a definable period of time and/or depending on a definable harvested material throughput or a definable travel distance on a field during the harvesting process to be performed. For this purpose, the multi-class classification may be performed as described above with reference to FIG. 6. Using multi-class classification, an additional distinction is made between the whole grains 23 and the crushed grains 24 as grain components 25.

The performed length determination of the long main axis 46 and the short main axis 47 of each classified whole grain 23 as a grain component 25 may be subsequently evaluated. A mean value $A_{mKB}$ representing the mean area of the whole grains 23 may be formed from the sum of the area $A_{KB}$ of whole grains 23 determined within the in particular time interval. This mean value $A_{mKB}$ may be used as a criterion for the mean grain size. The mean grain size may be determined via the polygons of the grain components 25 classified as "whole grain 23" using the determined short main axis 47 and long main axis 46 of the whole grain 23. An inertia factor, such as the time-spaced intervals, may be implemented over the progression of the method so that the mean grain size determined using the length-width comparison is only updated within a selected time window in relation to all whole grains 23 detected in the interval.

$$A_{mKB} = \frac{\sum A_{KB}}{B} \quad \text{Eq. [3]}$$

The mean value $A_{mKB}$ formed from the mean area of the whole grains 23 may be representative of the actual grain size of the processed harvested material. The adaptive limit value $r_{adapt}$ may then be dynamically derived from the mean value $A_{mKB}$ as a fractional value B of the long main axis 46 and/or the short main axis 47 (see Equation [4]).

$$r_{adapt} = \frac{A_{mKB}}{B} \quad \text{Eq. [4]}$$

For this purpose, the calculated adaptive limit value $r_{adapt}$ may be formed as the quotient of the mean value $A_{mKB}$ and the fractional value B. Half of the short main axis 47 and/or the long main axis 46 may be used as the fractional value, so that the processed grain component 25 is regarded as quartered. Alternatively, other fractional values B, such as thirds or fifths of the short main axis 47 and/or the long main axis 46, are also contemplated.

Then, by comparison, the limit value $r_{adapt}$ used in a previous interval may then be compared with the adaptive limit value $r_{adapt}$ calculated in the previous step. If there is a deviation, the previously calculated limit value $r_{adapt}$ may be used when performing the calculation. The adaptive limit value $r_{adapt}$ may be adapted automatically and/or manually.

The secondary crushing device 13 and the driver assistance system 17 may form an automatic processing unit. The automatic processing unit may be configured to optimize the one or more parameters for controlling the secondary crushing device 13 depending on the determined degree of grain cracking $CSPS_{opt}$ and to preset the optimized parameters of the secondary crushing device 13.

For this purpose, the determined value for the degree of grain cracking $CSPS_{opt}$ may be transmitted to the driver assistance system 17. The driver assistance system 17 may use the value determined in accordance with the method for the degree of grain cracking $CSPS_{opt}$ in order to automatically control at least the secondary crushing device 13 depending thereon. The automatic processing unit formed by the secondary crushing device 13 and the driver assistance system 17 may be configured to optimize at least one of the parameters of the secondary crushing device 13 depending on the determined degree of grain crushing $CSPS_{opt}$ and to preset the secondary crushing device 13. This may allow the efficiency and quality of the shredding process to be improved.

The images 44 with a resolution within a range between 128×128 pixels to 512×512 pixels may be fed as input data from the camera system 16 to the image analysis apparatus 27 for continuous evaluation by the image analysis method.

Figure 7:
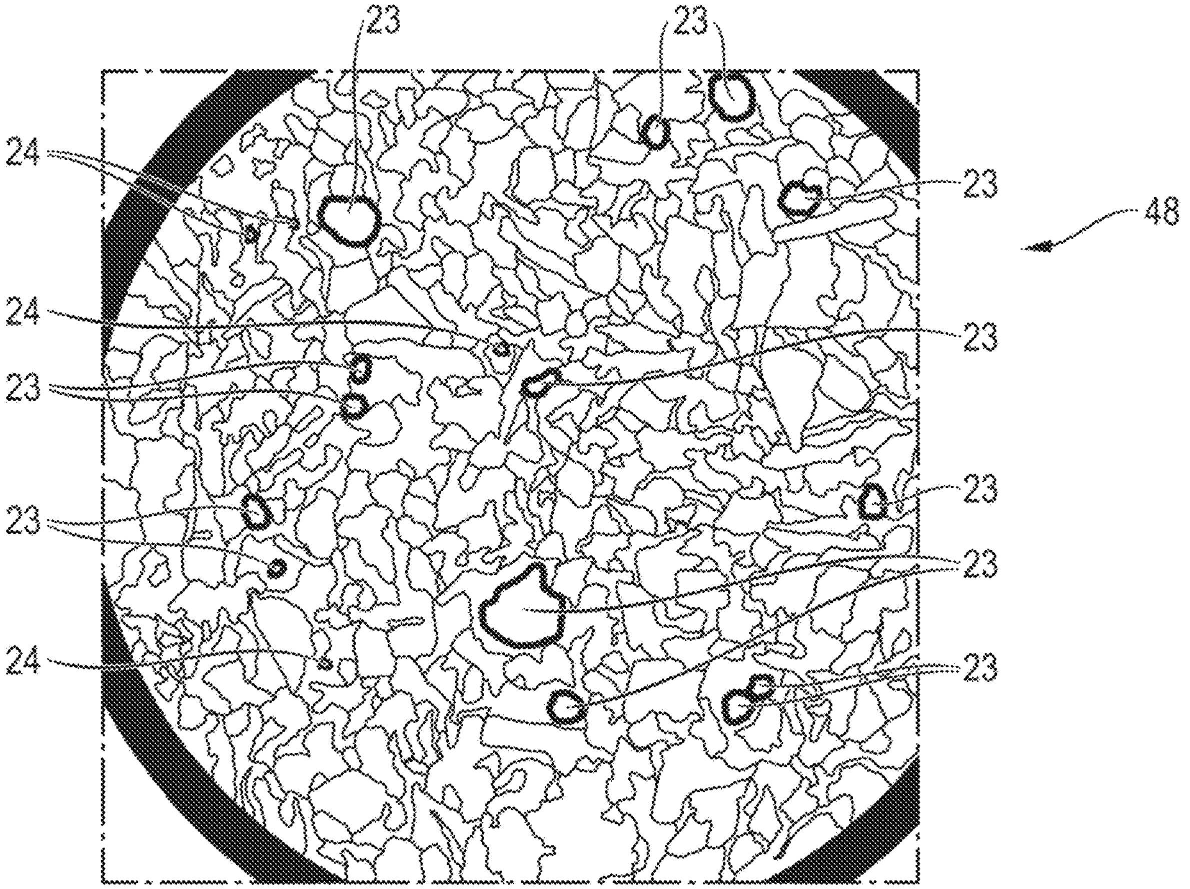
FIG. 7 illustrates a schematic and example visualization of whole grains and crushed grains in an image of the chopped crop recorded by the camera system.

The illustration in FIG. 7 shows a schematic and exemplary visualization of whole grains 23 and crushed grains 24 in an image 48 of the chopped harvested material taken by the camera system 16. The polygons detected or annotated as crushed grains 24 have a length of their short main axis 47 that is less than the limit value $r_{min}$. The polygons detected or annotated as whole grains 23 have a length of their short main axis 47 that exceeds the limit value $r_{min}$.

Figure 8:
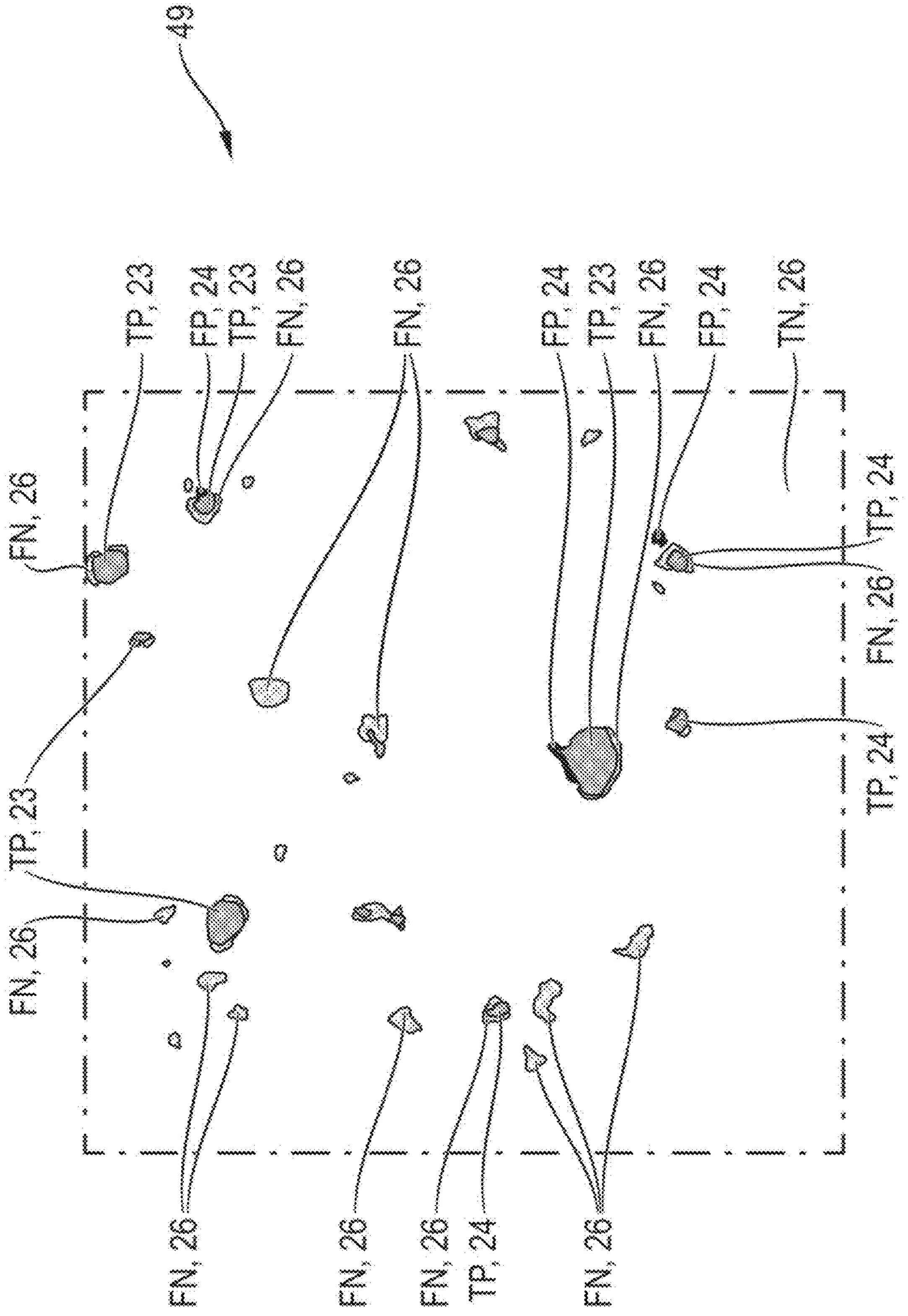
FIG. 8 illustrates a schematic and example pixel mask of the image analyzed by the image analysis method according to FIG. 7.

The illustration in FIG. 8 shows a schematic and exemplary pixel image 49 of the image 48 analyzed by the image analysis method according to FIG. 7. Therein, the whole grains 23, the crushed grains 24 and the non-grain components 26 are shown analogously to the binary image 45 according to FIG. 3.

In contrast to the binary image 45, the pixel image 49 uses the at least one neural network to illustrate the polygons calculated, such as by using the U-Net architecture as a segmentation model. For this purpose, the values of a confusion matrix, which may compare the frequency of the classification results and the test results, may be displayed in the pixel image 49. On the one hand, the frequency of classification of non-grain components 26 such as corn stalk or corn stalk fragments or the like as grains 23 and crushed grains 24, which may be referred to as "false positive" (false positive FP), and the frequency of classification of grains 23 and crushed grains 24 that are not identified and classified as such, which may be referred to as "false negative" (false negative FN), are determined and recorded in the confusion matrix. On the other hand, the frequency of classification of grain components 25 correctly classified as grains 23 or crushed grains 24, which is a "true positive" (TP) classification, and the frequency of correct classification of non-grain components 26, which is referred to as "true negative" (TN), are determined and also recorded in the confusion matrix. In the pixel image 49, the non-grain components 26 classified as "true negative" (TN) are shown in their entirety as a single-color background, analogous to the images 45 and 45*b*.

The image analysis method according to one aspect of the invention is based on the consideration that during the generation of training data, which may be obtained from the image data or images 48 by a manual annotation process, non-grain components 26, such as corn stalk or corn stalk fragments or the like, may be identified and classified as grains 23 and crushed grains 24, and that grains 23 and crushed grains 24 may not be identified and classified as such. This led to the realization that the proportion of grains 23 classified as false positive (FP) or crushed grains 24 generally predominates, which as a result, may reduce the accuracy of the determination of the degree of grain cracking $CSPS_{opt}$.

This influence on the accuracy of the proposed determination of the degree of grain cracking $CSPS_{opt}$ may be compensated for by the fact that a loss function used by the segmentation model is weighted with an adjustable weighting factor 3.

For this purpose, the weighting factor β may be set to a value greater than 0 and less than 1, such as to a value between 0.2 and 0.5. Setting the weighting factor β within the aforementioned range results in the sensitivity (e.g., the probability with which a positive object is correctly classified as positive) being weighted higher than the positive prediction value (e.g., the proportion of objects correctly classified as positive). With a weighting factor greater than 0 and less than 1, the sensitivity may be weighted more heavily so that the grain components 25, whole grains 23 and crushed grains 24, may be predicted with a high probability that they are actually grain components 25 on which the determination of the degree of grain cracking $CSPS_{opt}$ is based. If there is a lesser probability, the grain components 25 may be more likely not to be predicted. On the other hand, a value for the weighting factor β greater than 1 may lead to the increased probability that an object will be classified as positive, wherein these are "true positive" (TP) objects (e.g., grain components correctly classified as grains 23 or crushed grains 24), and "false positive" (FP) objects (e.g., non-grain components 26 are incorrectly classified as grains 23 or crushed grains 24).

Figure 9:
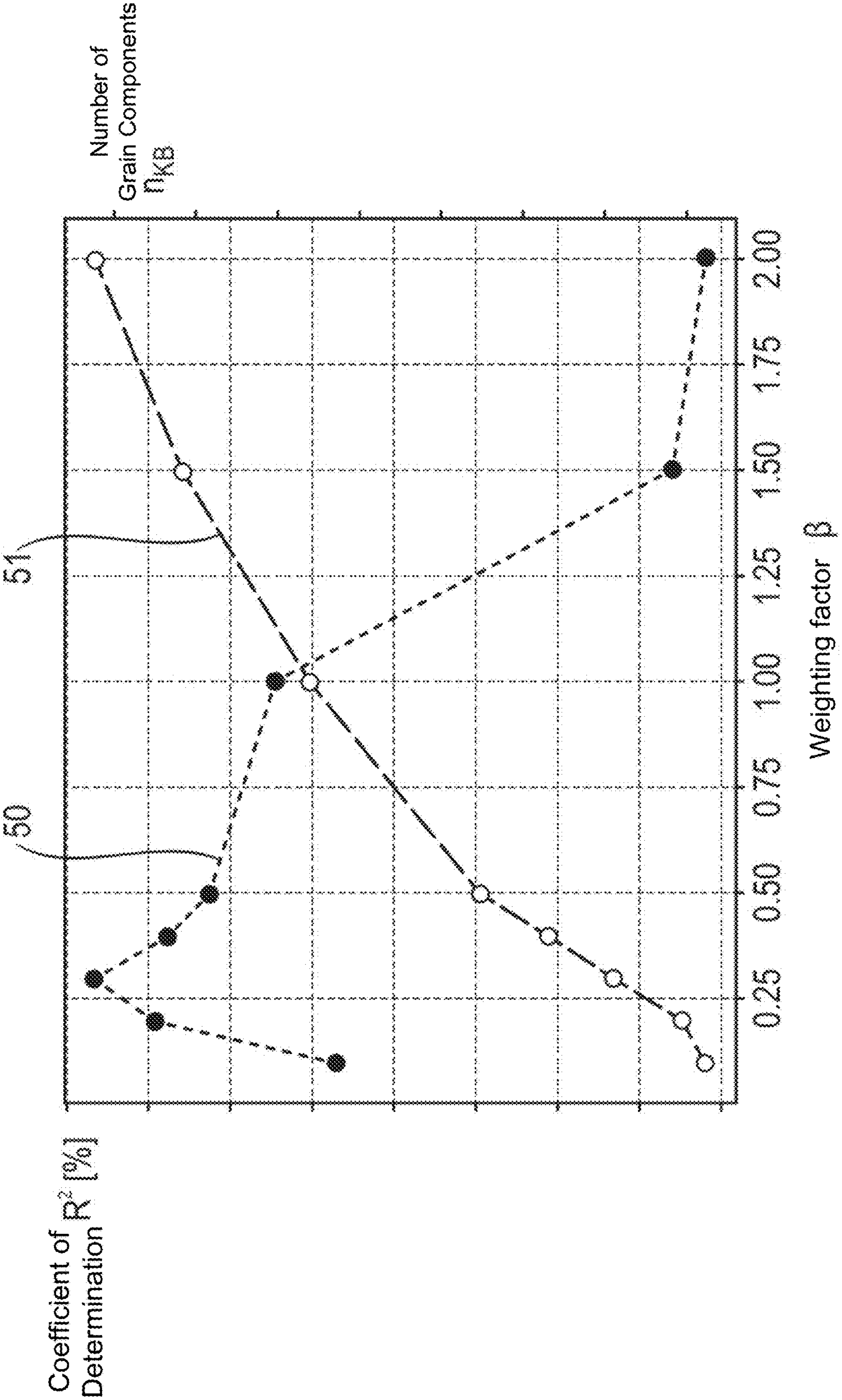
FIG. 9 illustrates an example of a diagram in which a curve for a coefficient of determination and a curve for a detected number of grain components over a weighting factor are shown.

FIG. 9 shows an example diagram of a curve 50 for a coefficient of determination $R^2$ and a curve 51 for a detected number $n_{KB}$ of grain components 25 that are determined on the basis of the training data provided by the at least one neural network of the image analysis apparatus 27. As may be seen from the diagram according to FIG. 9, the coefficient of determination $R^2$ resulting by means of the U-Net architecture as a segmentation model is highest for the weighting factor R which is set to a value between 0.2 and 0.5.

Figure 10:
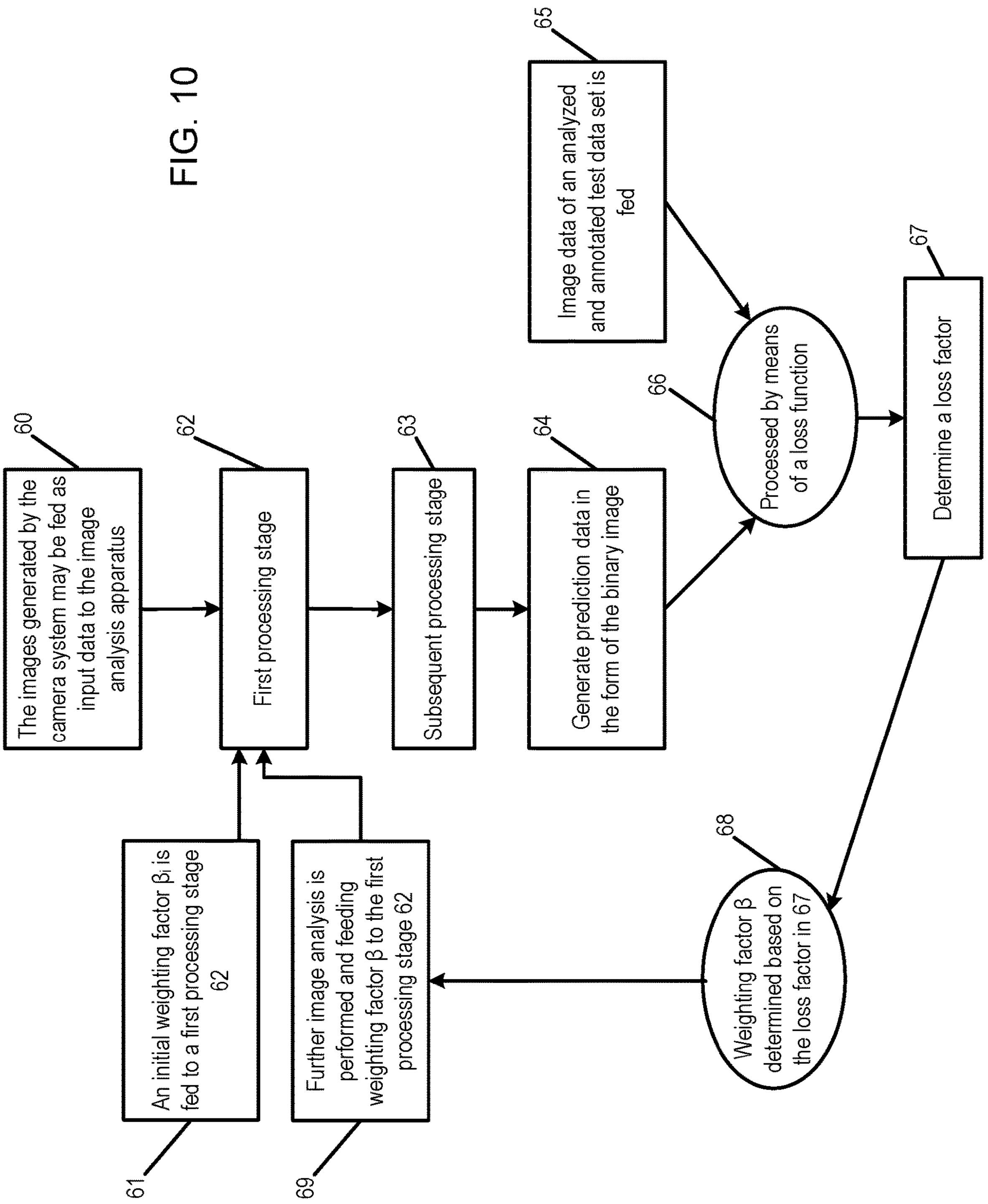
FIG. 10 illustrates a simplified flow chart of the image analysis method according to the invention.

The illustration in FIG. 10 shows a simplified flow chart of the image analysis method according to one aspect of the invention. In method step 60, the images 44 generated by the camera system 16 may be fed as input data to the image analysis apparatus 27. In step 61, an initial weighting factor $β_i$ is fed to a first processing stage 62 of the U-Net architecture. The result of the first processing stage 62 is fed to at least one subsequent processing stage 63, which may generate prediction data in the form of the binary image 45*b* in method step 64. In one or some embodiments, at the same time, image data of an analyzed and annotated test data set is fed in method step 65, which may be processed in the subsequent method step 66 by means of a loss function, taking into account the initial weighting factor $β_i$ preset in method step 61, in order to determine a loss factor ("loss score") in method step 67. In the subsequent method step 68, the weighting factor β may be determined on the basis of the loss factor determined in the preceding method step 67, which may be fed to the first processing stage 62 for further image analysis in method step 69.

The loss function used in method step 66 may be a dice-loss function. Good results may be achieved using the dice-loss function which may ensure that the results of the rarely existing classes are taken into account in the case of unevenly distributed classes.

The initially-set weighting factor $β_i$ may be adjusted iteratively during the harvesting process to be performed by forage harvester 1. The initial weighting factor $β_i$ may be set to the weighting factor β of a previous harvesting process performed on the field to be processed. This may mean that a weighting factor β that has already been optimized in the past may be used as the basis for the image analysis method. Alternatively, an initial weighting factor $β_i$ may be set automatically or manually within the range of values mentioned above.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

List of Reference Numbers

| | |
|---|---|
| 1 | Forage harvester |
| 2 | Corn plant |
| 3 | Pick-up device |
| 4 | Attachment |
| 5 | Pulling-in apparatus |
| 6 | Roller pair |
| 7 | Roller pair |
| 8 | Chopping device |
| 9 | Cutterhead |
| 10 | Shear bar |
| 11 | Conditioning or cracker roller |

-continued

| List of Reference Numbers | |
|---|---|
| 12 | Gap |
| 13 | Secondary crushing device |
| 14 | Postaccelerator |
| 15 | Discharge chute |
| 16 | Detection apparatus |
| 17 | Driver assistance system |
| 18 | Input/output unit |
| 19 | Driver's cab |
| 20 | Work unit |
| 21 | Harvested material flow |
| 22 | NIR sensor |
| 23 | Whole grains |
| 24 | Crushed grains |
| 25 | Grain component |
| 26 | Not grain component |
| 27 | Image analysis apparatus |
| 28 | housing |
| 29 | Window |
| 30 | Mirror |
| 31 | Lens |
| 32 | RGB camera |
| 33 | Light source |
| D | Overall diameter of 29 |
| $D_{29}$ | Diameter |
| $n_{KB}$ | Number of grain components |
| $R^2$ | Coefficient of determination |
| $r_{min}$ | Limit value |
| $r_{adapt}$ | Adaptive limit value |
| 34 | Field of vision |
| 35 | Top side of 15 |
| 36 | Mounting device |
| 37 | Control unit |
| 38 | Holder |
| 39 | Holding device |
| 40 | Retaining element |
| 41 | Retaining element |
| 42 | Slot |
| 43 | Slot |
| 44 | Image |
| 45 | Binary image |
| 45a | Section of 45 |
| 45b | Binary image |
| 46 | Long main axis |
| 47 | Short main axis |
| 48 | Image |
| 49 | Pixel image |
| 50 | Curve for a coefficient of determination |
| 51 | Curve for number of grain components |
| 60 | Method step |
| 61 | Method step |
| 62 | Processing stage |
| 63 | Processing stage |
| 64 | Method step |
| 65 | Method step |
| 66 | Method step |
| 67 | Method step |
| 68 | Method step |
| 69 | Method step |
| $\beta$ | Weighting factor |
| $\beta_i$ | Initial weighting factor |
| $CSPS_{opt}$ | Degree of grain |
| TP | True positive |
| TN | True negative |
| FP | False positive |
| FN | False negative |
| 70 | Processor |
| 71 | Memory |

The invention claimed is:

1. An image analysis method for a computer-implemented determination of a degree of grain cracking of grains within a flow of harvested material processed by at least one working unit of a forage harvester, the flow comprising whole grains and crushed grains as grain components and non-grain components, the method comprising:

recording, using a camera system, one or more images of the flow of harvested material;

determining, by an image analysis apparatus, the degree of grain cracking by:

classifying image pixels in the one or more images into grain components and non-grain components;

classifying, using a segmentation model, whole grains and crushed grains within the image pixels of the one or more images classified as grain components; and weighting a loss function used by the segmentation model with an adjustable weighting factor; and automatically controlling the at least one working unit based on the degree of grain cracking.

2. The method of claim 1, wherein the adjustable weighting factor is set to a value greater than 0 and less than 1.

3. The method of claim 1, wherein the adjustable weighting factor is set to a value between 0.2 and 0.5.

4. The method of claim 1, further comprising initially setting the adjustable weighting factor to an initial weighting factor of a previous harvesting process performed on a field to be processed by the forage harvester.

5. The method of claim 4, wherein initially setting the adjustable weighting factor is adjusted iteratively.

6. The method of claim 1, wherein the one or more images have a resolution within a range between 128×128 pixels to 512×512 pixels; and wherein the one or more images are accessed by the image analysis apparatus for evaluation as input data from the camera system.

7. The method of claim 1, wherein the adjustable weighting factor is set depending on limit values for an inference time and coefficient of determination of the segmentation model.

8. The method of claim 7, wherein the limit values for the inference time is less than 30 microseconds; and wherein the limit values for the coefficient of determination is greater than 70%.

9. The method of claim 1, wherein determining the degree of grain cracking uses at least one neural network that includes a U-Net architecture as the segmentation model.

10. The method of claim 1, wherein classification data determined by using the segmentation model and corresponding training data of whole grains and crushed grains are input to the loss function, from which a loss value is determined which is used in an optimization step to adjust the adjustable weighting factor.

11. The method of claim 1, wherein, to classify whole grains and crushed grains, a length determination of a long main axis and a short main axis of each classified grain component is performed using a length-width comparison; and to calculate the degree of grain cracking, quotient is formed from a sum of an area of classified grain components which fall below an adaptive limit value for length of the short main axes, and a sum of the area of all classified grain components.

12. The method of claim 11, wherein the adaptive limit value is automatically adapted cyclically at intervals based on one or both of the long main axis or the short main axis.

13. The method of claim 11, wherein the adaptive limit value is adapted manually.

14. The method of claim 11, wherein the adaptive limit value is adapted cyclically at intervals.

15. A self-propelled forage harvester comprising:
an attachment configured to pick up harvested material;
one or more working units configured to process a flow of the harvested material, the one or more working units comprising a secondary crushing device;
a camera system configured to obtain one or more images of the flow of harvested material;
an image analysis apparatus configured to determine a degree of grain cracking in the harvested material by:
classifying image pixels in one or more images into grain components and non-grain components;
classifying, using a segmentation model, whole grains and crushed grains within the image pixels of the one or more images classified as grain components; and
weighting a loss function used by the segmentation model with an adjustable weighting factor; and
a driver assistance system configured to automatically control the secondary crushing device depending on the degree of grain cracking.

16. The self-propelled forage harvester of claim 15, wherein the image analysis apparatus is designed with an algorithm for machine learning that is implemented as a neural network in a form of a U-Net architecture of a convolutional neural network or as a recurrent neural network.

17. The self-propelled forage harvester of claim 15, wherein the camera system comprises an RGB camera configured to detect the flow of harvested material flowing through a discharge chute of the self-propelled forage harvester;
wherein at least a part of the camera system is positioned on the discharge chute;
wherein a transparent viewing pane is positioned in the discharge chute past which the flow of harvested material to be detected flows;
wherein at least one light source is positioned opposite the transparent viewing pane, light beams from the at least one light source being directed onto the flow of harvested material;
wherein at least one mirror, configured to deflect light reflected by the flow of harvested material into a lens positioned on the RGB camera; and
wherein the RGB camera transmits recorded images of the flow of harvested material to the image analysis apparatus for evaluation.

18. The self-propelled forage harvester of claim 17, wherein the RGB camera is configured to record the one or more images at a frame rate within a range of 20 frames/second to 40 frames/second, with an exposure time between 5 microseconds and 258 microseconds, and with the lens of the RGB camera having a focal length of between 7 mm and 10 mm.

* * * * *